TRANSMISSION SYSTEM FOR IMPRINTED INTELLIGENCE

Filed Sept. 25, 1961 3 Sheets-Sheet 1

INVENTORS.
ROBERT S. BAILEY
ANDREW SENCHAK
BY STANFORD B. SILVERSCHOTZ
ERIC M. S. McWHIRTER
Alfred C. Hill
AGENT

TRANSMISSION SYSTEM FOR IMPRINTED INTELLIGENCE

Filed Sept. 25, 1961 3 Sheets-Sheet 2

INVENTORS.
ROBERT S. BAILEY
ANDREW SENCHAK
BY STANFORD B. SILVERSCHOTZ
ERIC M. S. McWHIRTER
Alfred C. Hill
AGENT

TRANSMISSION SYSTEM FOR IMPRINTED INTELLIGENCE

Filed Sept. 23, 1961 3 Sheets-Sheet 3

INVENTORS.
ROBERT S. BAILEY
ANDREW SENCHAK
BY STANFORD B. SILVERSCHOTZ
ERIC M. S. McWHIRTER
Alfred C. Hill
AGENT

United States Patent Office 3,261,911
Patented July 19, 1966

3,261,911
TRANSMISSION SYSTEM FOR IMPRINTED INTELLIGENCE

Robert S. Bailey, Waldwick, Andrew Senchak, Wayne, and Stanford B. Silverschotz, Livingston, N.J., and Eric M. S. McWhirter, Rye, N.Y., assignors to International Telephone and Telegraph Corporation, Nutley, N.J., a corporation of Maryland Filed Sept. 25, 1961, Ser. No. 140,415
32 Claims. (Cl. 178—6)

This invention relates to a system for the transmission of intelligences and more particularly to an improved system for the confidential transmission of visible intelligence concealed from view. This is a continuation-in-part of our copending application filed September 3, 1959, Serial No. 837,792.

In the transmission of intelligence there are two features which are often desirable; these are speed of transmission, such that the intelligence reaches an addressee in minimum time, and secrecy of transmission, such that the contents of the intelligence will remain confidential until it reaches the addressee. Until recently it was necessary to sacrifice one of these features in order to obtain the other, so that a decision had to be made in each particular situation whether time or secrecy was of paramount importance. For instance, if speed of transmission was desired, a facsimile or television system could be employed with the undesirable result that the intelligence was available to practically all the parties who effected the transmission of the intelligence. If secrecy was desired, the intelligence could be sealed in an enclosure, but this necessitated the physical delivery of the intelligence by the postal service or by private message which was necessarily time consuming. In a recent program to modernize the postal service, automation has been introduced which enables the realization of both confidential and speed of intelligence transmission. The equipment ot carry out this automation requires mechanical devices to open the enclosures containing the intelligence out of sight of the operations to permit the visual sensing of the intelligence for conversion of the intelligence to electrical signals. The original intelligence may then be resealed by mechanical means or destroyed to maintain the intelligence confidential. The electrical signals produced are transmitted by facsimile or television techniques to the appropriate receiving point and there the intelligence is reproduced, sealed and addressed by mechanical means out of sight of the operations to maintain the intelligence confidential at the receiving end of the transmission system. As is known, mechanical components can become defective through wear resulting in a considerable amount of outage time for the transmission system. Further, if the mechanical automation system goes out of adjustment the original intelligence could become lost by destruction of the medium carrying the intelligence during the opening or sealing process. Mechanical devices also can consume considerable time in carrying out their desired functions and further, the necessity of first opening the enclosure containing the intelligence at the transmitting end of the system and then sealing the intelligence into an enclosure and addressing this enclosure at the receiving end is also time consuming.

It would be useful and desirable to have a system providing both the features of secrecy and minimum transmission but without resorting to the mechanical equipment described hereinabove.

Therefore, an object of this invention is to transmit visible intelligence by wave energy between two spaced points while maintaining confidential the intelligence covered by a material opaque to visible light at all times at both spaced points.

Another object of the present invention is to transmit visual intelligence at the speed of facsimile signals or higher over public communication systems with the intelligence being maintained confidential as is done in normal postal service.

Still another object of the present invention is to transmit visual intelligence enclosed in an enclosure opaque to visible light at the speed of facsimile signals or higher over public communication systems with the intelligence within an enclosure opaque to visible light being converted to wave energy and the wave energy being reconverted to intelligence within an enclosure opaque to visible light.

A feature of this invention is the provision of a system to transmit intelligence from a source not capable of being visually sensed to a remote location for reproduction of the intelligence in a manner to prevent visual sensing of the intelligence by other than the person for whom the intelligence is intended. The intelligence may be in the form of visual tracings on a medium which is concealed from view by an enclosure opaque to visible light. The tracings are made of some material that has a different characteristic than the medium upon which it is carried so that the tracings may be sensed through the enclosure by an appropriate sensing device to convert the tracings to electrical energy at the transmitting end. The material forming the tracings may be a magnetic deposit, a metallic deposit, or a substance having a transmission characteristic relative to the transmission characteristic of the medium carrying it to respond to X-ray, infrared or ultraviolet energy. At the receiving end a suitable receiver responsive to the produced electrical energy will reproduce the intelligence on a medium concealed from view by an enclosure opaque to visible light. This could be accomplished, for example, by sensitizing the medium to respond to X-ray energy, infrared energy, or voltage, or by some type of transfer arrangement which could transfer marks to the medium in response to electrical or magnetic energy. To assure the delivery of the intelligence to the intended person, the address should be reproduced for visual sensing externally of the enclosure. The externally visible address may be produced, for example, on a particular portion of the intelligence medium registered to be visible through a transparent window in the enclosure.

The above-mentioned and other features and objects of this invention will become more apparent by reference to the following description taken in conjunction with the accompanying drawings, in which.

Figures 1, 2, 3, 4:
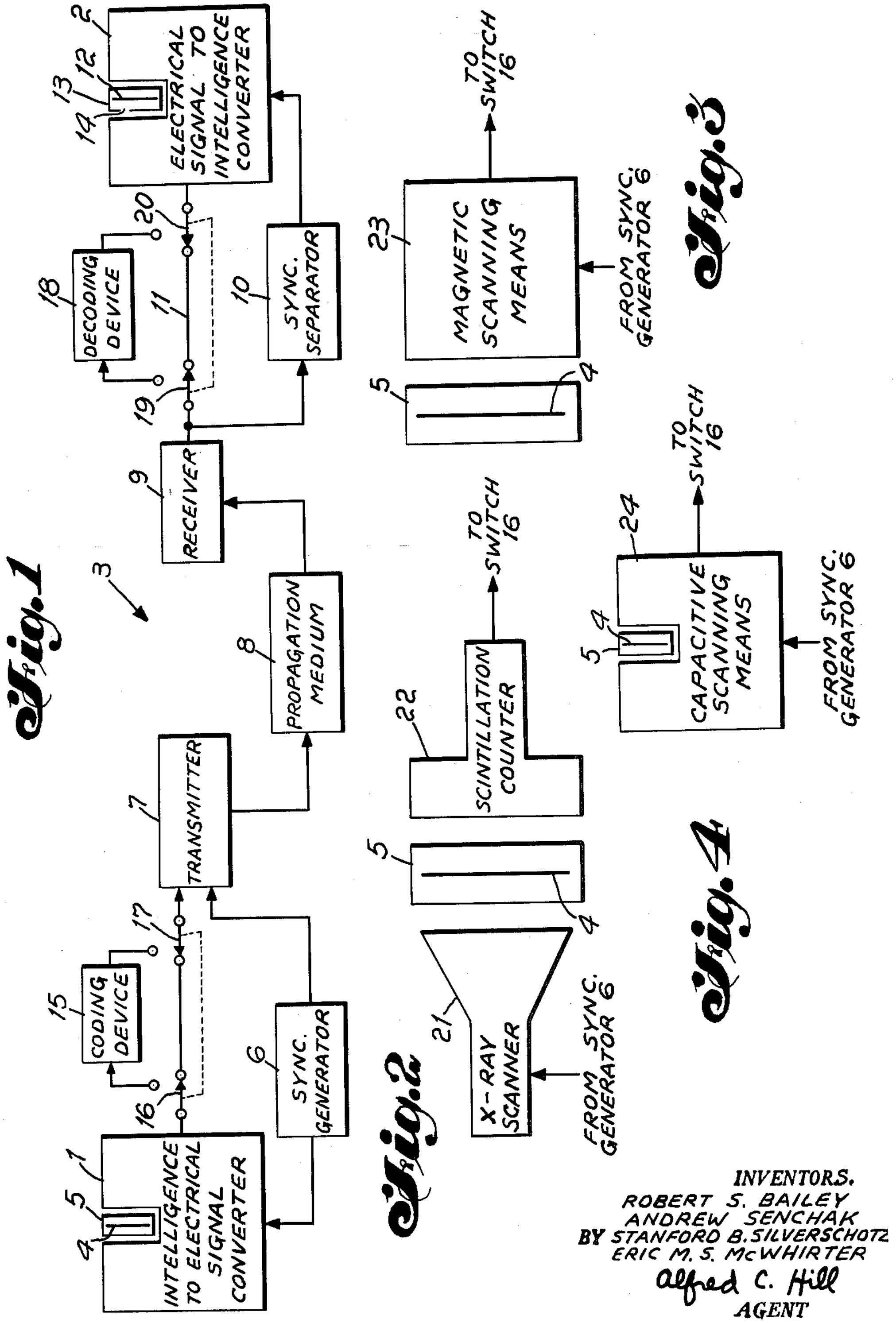
FIG. 1 is a block diagram of a system illustrating the principles of the present invention.
FIG. 2 is a block diagram illustrating a preferred embodiment of the intelligence to electrical signal converter in the system of FIG. 1.
Figures 5, 6, 7, 8, 9:
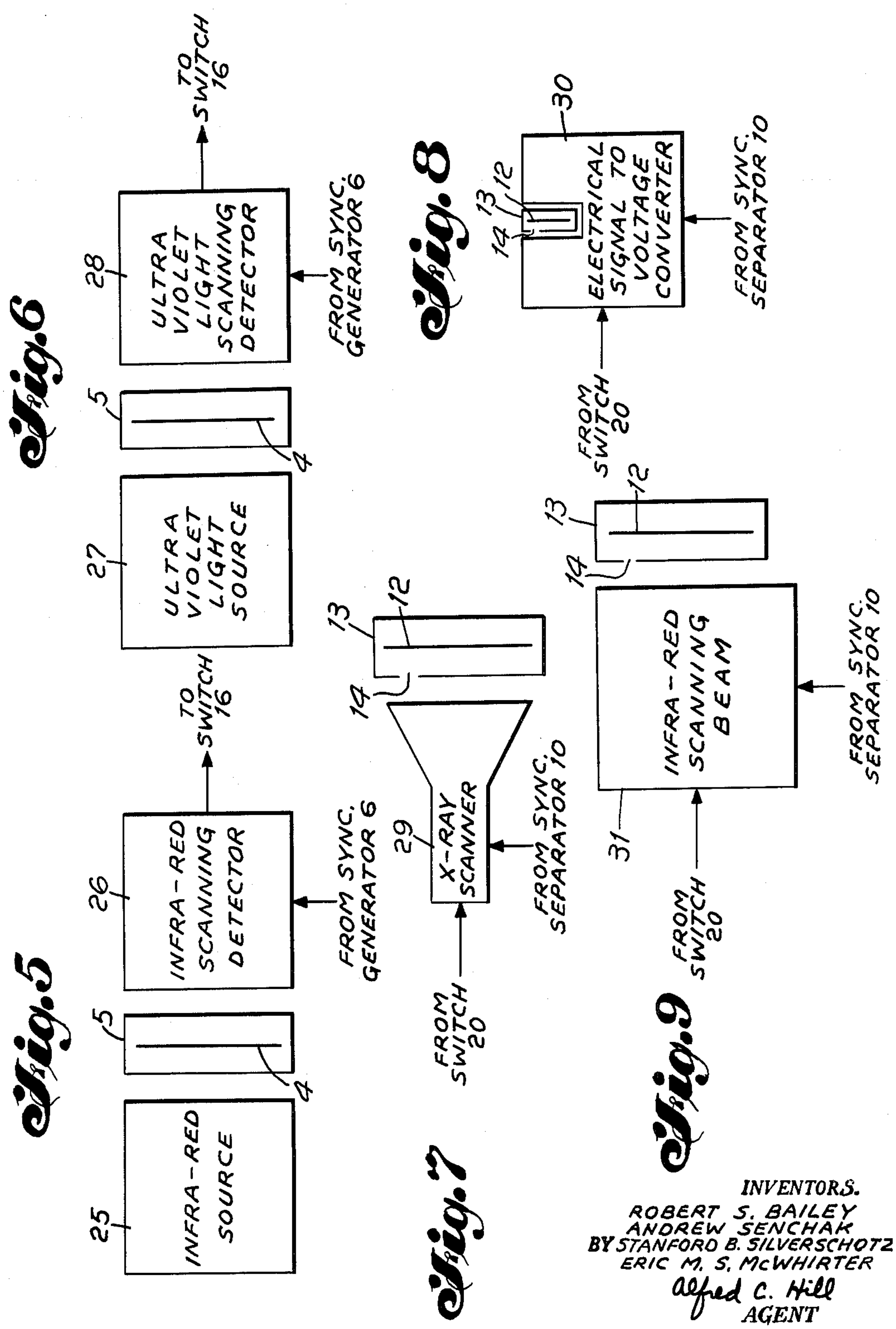
Figure 10:
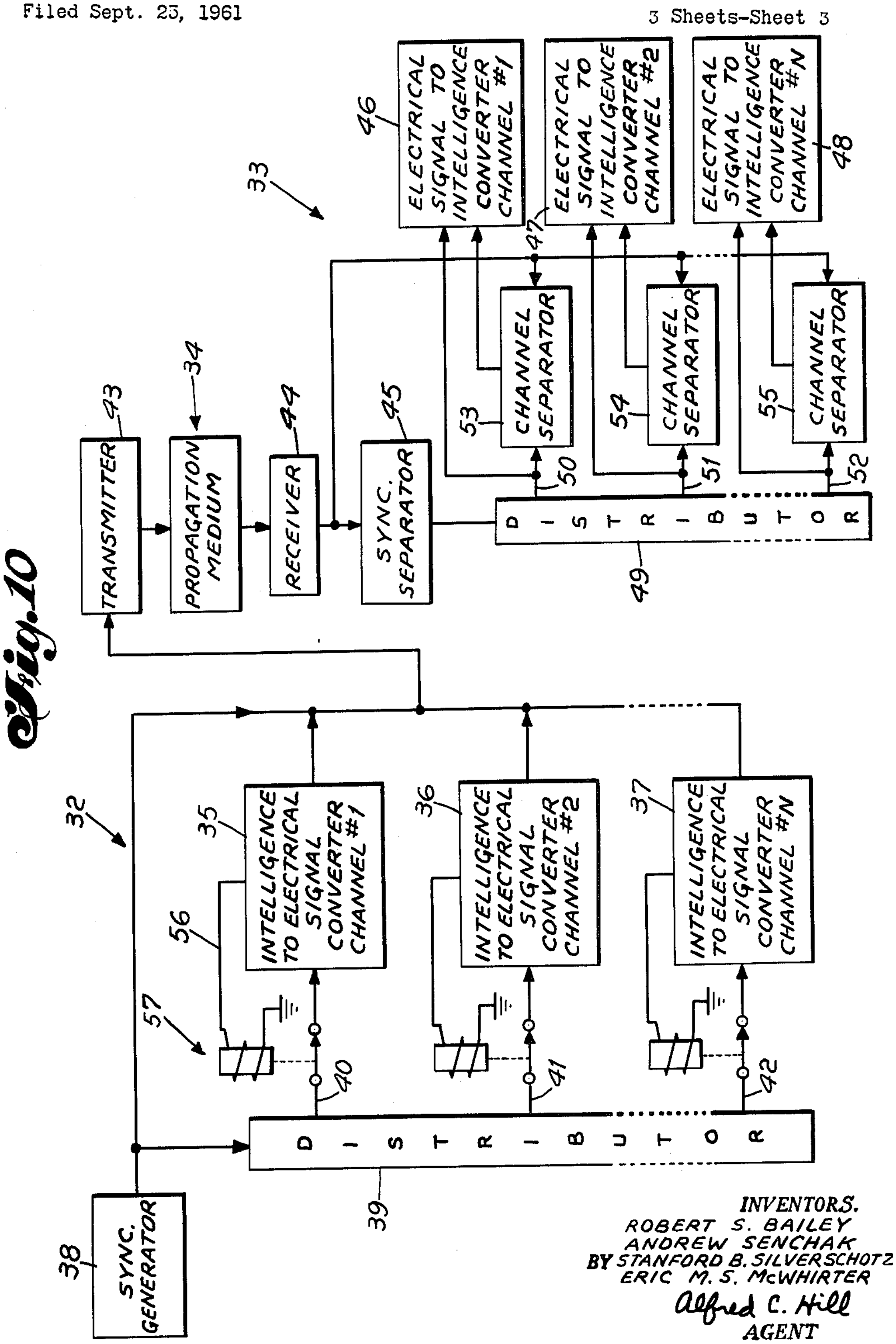

FIGS. 3, 4, 5, and 6 are a block diagram illustrating alternative embodiments of the intelligence to electrical signal converter of FIG. 1;

FIG. 7 is a block diagram illustrating a preferred embodiment of the electrical signal to intelligence converter of FIG. 1;

FIGS. 8 and 9 are block diagrams illustrating alternative embodiments for the electrical signal to intelligence converter of FIG. 1; and FIG. 10 is a block diagram illustrating the incorporation of the system of FIG. 1 in a multiplex system.

Referring to FIG. 1, a system is illustrated for transmitting intelligence from a source not capable of being visually sensed, such as intelligence concealed from view by a covering opaque to visible light, comprising conversion means 1 to convert the intelligence into electrical signals, conversion means 2 to convert the electrical signals into the intelligence at a point remote from means 1, and a means 3 to couple the electrical signals from means 1 to means 2.

For purposes of explanation, the operation of the system of FIG. 1 will be described in the environment of a postal system where it is desirable to have the intelligence imprinted in the form of a visible trace upon a medium with the medium then being placed in an enclosure opaque to visible light and with the thusly disposed intelligence being sensed by means other than visible light for transmission to a remote location where the intelligence is then reproduced upon a medium concealed from view in an enclosure opaque to visible light with this latter enclosure being delivered to the addressee whose address is externally visible by means described hereinafter.

The operation of the system of FIG. 1 requires that the subscriber prepare the intelligence which is desired to be transmitted by printing or writing the intelligence on a suitable medium, such as paper. The writing or printing of the intelligence will be in the form of traces upon the medium with the tracing having a different characteristic than the medium so that the tracings may be sensed through an enclosure opaque to visible light by an appropriate sensing device to convert the traces to electrical energy at the transmitting end. The various characteristics of the tracings and the medium which may be employed to carry out the present invention will be described hereinafter with reference to FIGS. 2 through 6. After the intelligence is placed on medium 4, the medium is sealed with an enclosure 5 opaque to visible light but effectively transparent to the sensing device, such as a paper envelope. The intelligence contained in enclosure 5 is disposed in converter 1 which under control of synchronizing generator 6 scans the intelligence within enclosure 5 so as to produce at the output of converter 1 an electrical signal which varies in accordance with the intelligence carried on medium 4. Thus, upon the scanning of the complete surface of medium 4 there is provided varying electrical signals representing the intelligence carried by medium 4. These intelligence bearing electrical signals are fed along with the signal output of generator 6 to transmitter 7. Transmitter 7 operates to transmit both the synchronizing signal and the intelligence bearing electrical signals from converter 1 through a suitable propagation medium 8, such as a coaxial cable, open wire, waveguide or electromagnetic radiation, to receiver 9 disposed at a point remote from transmitter 7. The synchronizing signal is separated from the intelligence bearing electrical signal by synchronizing signal separator 10 and fed to converter 2 to operate converter 2 in synchronism with converter 1. The intelligence bearing electrical signal is fed along conductor 11 to converter 2 which responds to the intelligence bearing electrical signal to reproduce to intelligence in the form of visual traces upon a medium 12 contained within an enclosure 13 opaque to visible light but effectively transparent to the energy bringing about the desired reproduction of the intelligence on medium 12. Thus, intelligence, such as a message, has been transmitted to a remote point in a minimum of time while the intelligence remains unknown to all parties other than the subscriber and the addressee and the intelligence remains always within its enclosure both at the transmitting and receiving ends of the system.

In order that the intelligence contained in enclosure 13 may be directed to the correct addressee, a small visible light transparent window 14 may be included at a particular location in enclosure 13. The subscriber in preparing the original message to be contained within enclosure 5 would print the necessary identification, such as the addressee's name and address, on the corresponding particular location on medium 4 so that the address will be disposed on medium 12 in registry with window 14.

Still referring to FIG. 1, the system described may have the secrecy feature thereof improved by providing a coding device 15 which may be connected between converter 1 and transmitter 7 by means of ganged switches 16 and 17. The intelligence bearing electrical signal from converter 1 may thereby be directed to the coding device 15 and encoded into a predetermined code prior to transmission by transmitter 7 to insure that the subscriber's message will remain secret during transmission even if received by unauthorized receivers. A decoding device 18 may be coupled between receiver 9 and converter 2 by ganged switches 19 and 20 to decoded the coded intelligence bearing electrical signal to recover the original intelligence bearing electrical signal prior to introducing it into converter 2.

Referring to FIG. 2, there is illustrated therein a preferred embodiment for converter 1 including an X-ray scanner 21 and a scintillation counter 22. In systems employing the embodiment of FIG. 2, the subscriber would prepare the intelligence by inscribing a trace upon the printing medium 4 which would be disposed on top of a second medium having a predetermined characteristic, such as a sheet of paper containing a coating of an X-ray opaque substance, for instance, barium. The pressure required by the subscriber's stylus during the printing or writing of the intelligence causes a barium trace to be deposited on the back of the writing medium as a mirror image of the inscribed intelligence. The subscriber then seals medium 4 in the enclosure 5. The enclosure 5 and medium 4 would then be disposed between X-ray scanner 21 and scintillation counter 22 so that the front of medium 4 faces the scanner 21. The signal from synchronizing generator 6 is coupled to scanner 21 to activate the operation thereof in a manner to produce an X-ray beam that will scan the surface of medium 4 in a suitable fashion, such as a raster. The deflection of the X-ray beam may be produced in scanner 21 by horizontal and vertical deflection yokes, a mutating deflection crystal, or by other known X-ray beam deflection methods. The X-ray beam, as it scans, will pass completely through the enclosure 5 which is opaque to visible light but transparent to X-rays. In passing through enclosure 5 the beam will be intercepted by medium 4 contained therein with the intensity of the X-ray beam being varied by the barium tracings forming the intelligence to be transmitted. This variation of the X-ray beam is due to the fact that medium 4 is transparent to X-rays in those areas not containing the barium tracing and is opaque to X-rays in those areas containing the barium tracings, since barium is opaque to X-rays. The X-ray beam, after it passes through enclosure 5, will impinge upon the sensitive element of scintillation counter 22 producing an electrical output signal therefrom. The electrical output signal from counter 22 will have a first predetermined value indicating the reception of the X-ray beam by counter 22 indicating an absence of the barium tracing in the particular surface area of medium 4 being scanned and a second predetermined value in the absence of the X-ray beam impinging on counter 22 indicating the presence of a barium tracing in the particular surface area of medium 4 being scanned. Since the difference in value of the electrical output signal of counter 22 indicates the presence or absence of the intelligence in the form of barium tracings, the scanning of the entire surface of medium 4 by scanner 21 will cause the entire printed intelligence contained thereon to be translated into electrical signals by counter 22. The thusly produced varying or intelligence bearing electrical signals from counter 22 are coupled to switch 16 and, hence, to the transmitter 7 for propagation through medium 8 along with the synchronizing signal of generator 6.

Referring to FIG. 3, there is illustrated therein an alternative embodiment of converter 1 wherein the subscriber employs a stylus to impress the intelligence upon medium 4 in the form of tracings of a magnetic deposit. The material deposited may be a ferromagnetic material finely divided and dispersed in a suitable carrier, such as water or ink. Thus, when the subscriber writes or prints his intelligence upon medium 4, the intelligence is in the form of a ferromagnetic material trace. When medium 4 carrying the ferromagnetic material traces is sealed in enclosure 5, the intelligence may be converted to intelligence bearing electrical signals by means of a magnetic scanning means 23 including therein an arrangement to detect through enclosure 5, on a line-by-line scanning basis variations in magnetic flux, the magnetic flux being greater in the areas of medium 4 containing the ferromagnetic material traces and less in those areas of medium 4 having no ferromagnetic material traces. Again the operation of the scanning means 23 is controlled by the synchronizing signal of generator 6 with the output of means 23 being coupled to switch 16 and, hence, to transmitter 7 for transmission through propagation medium 8 along with the signal of generator 6.

Referring to FIG. 4 there is illustrated therein a capacitive scanning means 24 which when employed in conjunction with tracings of the proper material on medium 4 will enable the development of intelligence bearing electrical signals for coupling to transmitter 7 through switch 16 as in the previous embodiments. In this alternative embodiment the subscriber would write or print his intelligence on medium 4 in the form of tracings containing a metallic deposit which, as in the case of the embodiment of FIG. 3, could be delivered to medium 4 by means of fine metal particles dispersed in water or ink as the carrier or writing fluid. With this type of tracing on medium 4, means 24 would include an arrangement to detect on a line-by-line basis voltage variation due to the presence or absence of the metallic tracings forming the written intelligence. Such an arrangement could include a solid plate on one side of enclosure 5, registered with and parallel to the medium 4 and a plurality of small closely spaced separate plates on the other side of enclosure 5 registered with the solid plate. When a voltage is applied between the solid plate and the separate plates in a scanning sequence voltage variations will be present due to the changing capacity between the solid plate and separate plates depending upon the presence or absence of the metallic traces within the area being sensed. Thus, the variation of capacitance would generate an electrical signal which varies in accordance with the intelligence upon medium 4. Another arrangement could include a metallic probe moved mechanically in a scanning sequence to detect capacity variations due to the presence or absence of the metallic traces within the area being sensed. The capacity variation again would generate an intelligence bearing electrical signal.

Referring to FIG. 5, an alternative embodiment for converter 1 is illustrated as including an infrared source 25 illuminating enclosure 5, composed of a material transparent to infrared energy, and medium 4 containing thereon the intelligence in the form of traces which have a transmission characteristic relative to infrared energy different than the transmission characteristic of medium 4. By employing an infrared scanning detector 26, the intelligence contained on medium 4 can be scanned and the intensity of the infrared energy passing through medium 4 and the traces thereon can be detected and will provide an electrical signal varying in accordance with the intensity variation of the infrared energy and, hence, the intelligence carried by medium 4. In one variation of the embodiment of FIG. 5, the medium 4 could be composed of a heat absorbing material with the subscriber writing his message on medium 4 in a manner to remove in the traces of the intelligence the heat absorbing material. With the infrared source 25 causing the medium 5 to be heated, the detector 26 will detect the variation of heat transmission through medium 4 as the detector scans the tracings comprising the intelligence. In another variatiotn of the embodiment of FIG. 5, it would not be necessary to employ a special material for medium 4 but would require only that the trace have a different transmission characteristic than medium 4 so that when illuminated by infrared light it would be possible to obtain an intensity variation of this infrared light after passing through medium 4. It has been found that the usual pencil or pen and writing paper will provide the required difference in transmission characteristic for the writing implement trace and paper. It is of course necessary in this arrangement to provide an enclosure 5 which is transparent to infrared light but yet opaque to visible light. Such a coating material for the envelope could include a shellac including an infrared transparent dye, such as is used in infrared flash bulbs. Detector 26 in this latter variation after the intelligence and envelope have been properly prepared and illuminated by the light from source 25 would include a snooperscope which detects the infrared light and the variations thereof due to the tracing comprising the intelligence, translates the detected varying infrared light into visible light which then is translated by means of photoelectric cells into intelligence bearing electrical signals for transmission.

With reference to FIG. 6, there is disclosed therein still another embodiment of converter 1 utilizing ultraviolet light comprising a source 27 of ultraviolet light and a scanning detector 28 responsive to ultraviolet light to convert this ultraviolet light into electrical signals. As in the case of the second variation described hereinabove with respect to FIG. 5, the intelligence impressed upon medium 4 need only be such as to provide a transmission characteristic which is different than the transmission characteristic of medium 4. As in this variation of FIG. 5, the writing implement for the embodiment of FIG. 6 can be the usual pencil or pen. To insure that envelope 5 is transparent to ultraviolet light, and yet opaque to visible light, the enclosure 5 is coated with a shellac including a dye transparent to ultraviolet light, such as the dye employed in black light bulbs. The detector 28 to detect the variation in ultraviolet light passing through medium 4, imparted thereto by the different transmission characteristics of medium 4 and the traces forming the intelligence, is similar in nature to the snooperscope type of detector described in connection with detector 26 of FIG. 5. In other words, the ultraviolet light is detected by a scanning device to convert this ultraviolet light into visible light with photocells responding to the varying visible light to produce the intelligence bearing electrical signals for transmission to the receiving end of the transmission system.

Referring now to FIG. 7, there is illustrated therein the preferred embodiment of converter 2 to convert the received electrical signals into intelligence on medium 12 within enclosure 13. The preferred embodiment includes an X-ray scanner 29. The synchronizing signal separated by separator 10 is fed to X-ray scanner 29 to synchronize scanner 29 with the scanning operation employed in converter 1. The intelligence bearing electrical signal received by receiver 9 is coupled to the intensity control grid of scanner 29 causing a variation in the intensity of the electron beam of scanner 29 proportional to the variations of the electrical signal. The X-ray beam from scanner 29 impinges upon enclosure 13 containing medium 12 coated or treated with a material which will undergo a change in its characteristic, such as a color change, when exposed to the X-ray beam. A suitable material for this purpose would be a coating of potassium hydride activate of potassium bromide crystals which turns blue when exposed to X-rays. The X-ray beam from scanner 29 will strike the treated surface of medium 12 contained in enclosure 13 with less intensity when the electrical signal is at its first predetermined value, that is, when there is no intelligence present in the electrical signal and, hence, medium 12 will not change color. When the electrical signal from receiver 9 is at its second predetermined value, that is, when there is intelligence present in the electrical signal, medium 12 will be struck with greater intensity by the X-ray beam from scanner 29. This increased intensity of the X-ray beam will cause a color change on medium 12. Due to the synchronization established between converters 1 and 2 of the system of FIG. 1, areas of medium 12 will undergo a color change in registry with those areas of medium 4 containing the intelligence and, hence, medium 12 will contain a two-color facsimile of the intelligence carried by medium 4.

Referring to FIG. 8, there is illustrated therein an alternative embodiment for converter 2 of FIG. 1 including converter 30 which converts the intelligence bearing electrical signal to a voltage. Medium 12 in this instance is a voltage sensitive material responding to the produced voltage to reproduce the intelligence originally imprinted upon medium 4. More specifically, the voltage sensitive material may be a voltage sensitive paper, such as is used in certain conventional facsimile machines, and the intelligence bearing electrical signal is converted in converter 3 to a voltage which is caused to scan in synchronism with the scanning at the transmitting end of the system of FIG. 1 to reproduce the intelligence upon the voltage sensitive paper of medium 12.

Referring to FIG. 9, there is illustrated still another alternative embodiment to reproduce the original intelligence on medium 12 within the enclosure 13. In this embodiment a device 31 provides an infrared scanning beam whose intensity is varied in accordance with the variation of the received intelligence bearing electrical signal and caused to scan in synchronism with the scanning of medium 4. Medium 12 in this instance would be a heating sensitive paper to respond to the scanning infrared beam to reproduce the original intelligence upon medium 12.

In FIGS. 2 through 6 several embodiments for converter 1 have been described and in FIGS. 7 through 9 several embodiments for converter 2 have been described. There is no requirement that when the intelligence on medium 4 is converted to electrical signals by X-ray equipment that the function of converter 2 must be accomplished by X-ray equipment. In other words, regardless of the device employed to translate the original intelligence into electrical signals, the equipment at the receiver end performing the function of converter 2 may be any of the devices described or any other known arrangement which will provide the desired end result. Thus, the arrangement for reproducing the intelligence at converter 2 is independent of the arrangement for deriving the intelligence bearing electrical signal from the intelligence contained on medium 4.

In the system illustrated in FIG. 1, the enclosure 5 must be placed in position either by hand or by a mechanical conveying arrangement prior to the scanning operation. After the scanning operation enclosure 5 must be removed physically and replaced with the succeeding enclosure containing the next message to be scanned. Since the time required in inserting and removing the enclosure is of much greater magnitude than the time required for the scanning operation, the scanning operation becomes intermittent and there is a loss of efficiency. The system of FIG. 10 may be employed to provide a more continuous operation and a greater saving in time.

Referring to FIG. 10, a system is shown for transmitting intelligence contained in a plurality of enclosures opaque to visible light of the type described hereinabove comprising a plurality of means 32 to convert the intelligence in each of the enclosures into time multiplexed electrical signals, a plurality of means 33 to time separate and convert the electrical signals into printed intelligence at a point remote from means 32, and means 34 coupling the electrical signals from means 32 to means 33.

A plurality of identical channel equipments is illustrated designated as 35, 36, and 37. Only three channels are shown for the purposes of illustration, but it is to be understood that any number of channels (N) may be employed. Each channel equipment includes any of the converters illustrated in FIGS. 2, 3, 4, 5, and 6. The function of each channel equipment is to convert the intelligence contained in the enclosure into electrical signals in the manner described hereinabove with respect to FIG. 1 broadly and more specifically with respect to FIGS. 2, 3, 4, 5, and 6. The enclosures opaque to visible light containing the medium carrying the intelligence may be inserted in and removed from each channel equipment by suitable automatic mechanical means and a sufficient supply of encloesd intelligence media for each channel may be kept in readiness to be automatically inserted. A synchronizing signal generator 38 is coupled to a delay line distributor 39. Delay line distributor 39 contains a plurality of taps 40, 41, and 42 disposed therealong and coupled respectively to channel equipments 35, 36, and 37. The operation of the synchronizing signal generator 38 and distributor 39 produces a series of synchronizing signals time delayed with respect to each other. The converters in the individual channels commence operation in time sequence as dictated by the timing of the output signals on taps 40, 41, and 42. A transmitter 43 is coupled in common to the outputs of converters 35, 36, and 37 and synchronizing signal generator 38. The electrical output pulses of channel equipments 35, 36 and 37 representing the intelligence carried on the medium in the individual enclosures, are therefore interleaved in time sequence and transmitted by transmitter 43 along with the synchronizing signal from generator 38.

The transmitted signals are received by receiver 44 and a synchronizing signal separator 45 is coupled to the output of receiver 44 to separate the synchronizing signal from the intelligence bearing electrical signals and produces a timing signal to synchronize the channel converters 46, 47, and 48 with the corresponding channel converters 35, 36, and 37. The timing signal from synchronizing separator 45 is fed to a delay line distributor 49 which contains taps 50, 51, and 52 disposed therealong. Taps 50, 51, and 52 are coupled to a plurality of channel separators 53, 54 and 55, such as coincidence gates, to separate the appropriate channel signals from the multiplexed received signals. The output of receiver 44 is also coupled to channel separators 53, 54, and 55. The simultaneous presence of a timing signal from distributor 49 and the intelligence bearing electrical signals from receiver 44 at each channel separator causes it to operate to pass the intelligence bearing electrical signal of that channel to its associated one of the channel converters 46, 47, and 48, each of the channel converters containing a converter as described in connection with converter 2 of FIG. 1 and more specific any of the converters described with reference to FIGS. 7, 8, and 9. Since the timing signals of taps 50, 51, and 52 are in time sequence, the outputs from channel separators 53, 54, and 55 will be in time sequence and the interleaved intelligence pulses from receiver 44 will be time separated into the individual intelligence units originally produced by channel converters 35, 36, and 37. These individual intelligence units, still in the form of electrical signals, appear at the outputs of channel separators 53, 54, and 55 and, as such, are coupled respectively to channel converters 46, 47, and 48. The timing signals from taps 50, 51, and 52 are likewise respectively coupled to channel separators 46, 47, and 58 causing each channel separator to commence operation at the same location as the scanning was commenced at the transmitting end of the system. The intelligence on the medium contained in the enclosure opaque to visible light in channel converter 35 will appear on the medium contained within the enclosure opaque to visible light in channel converter 46, the intelligence operated upon by channel converter 36 will appear on the enclosed medium in channel converter 47, and so on in sequence. Since it is possible to use N channels in this system, it is seen that after the intelligence contained in the enclosure in the initial channel has been scanned, transmission of intelligence will continue from the remaining $N-1$ channels operating in sequence during which time a new enclosure containing this intelligence may be automatically inserted in the initial channel in ample time to be scanned in sequence after the scanning of the $N^{th}$ channel. Automatic mechanical means may also be provided to insert the enclosed medium in each of the channel converters 46, 47, and 48 and to remove these enclosures when intelligence has been reproduced on the medium contained therein.

In the operation of the system illustrated in FIG. 10, wherein as many as N scanning devices may be sequentially operated, it is possible that the supply of enclosed intelligence carrying media for one or more of the channels may become exhausted and no enclosures will be inserted in the channel equipment. In such an event, it would not be desirable to have the scanning devices located in those channels operate. In order to insure that the scanning devices of a particular channel which does not contain an enclosure therein will not operate, a sensing device may be included in each of the channel equipment. The sensing device will include a tripping mechanism actuated by the enclosure opaque to visible light when the enclosure is present within the converter. When an enclosure is not within the converter, the tripping mechanism will not be actuated thereby causing an electronic, electromechanical or mechanical switch to disengage the particular converter from the delay line distributor so that a synchronizing signal will not be applied to the scanning device and the operation of the scanning device will not be commenced. Assuming, as an illustration, that the supply of intelligence containing enclosures for converter 35 has been exhausted, no enclosure will be present in converter 35 and the tripping mechanism will not sense the presence of an enclosure. This will cause a signal to be applied through conductor 56 to switch 57 illustrated as an electromechanical device for purposes of explanation. Switch 57 will operate thereby disengaging converter 35 from distributor 39. With distributor 39 thus disengaged, a synchronizing signal will not be coupled to converter 35 and the scanning device will not operate.

It is also to be understood that the coding scheme described in connection with FIG. 1 may also be incorporated in the system of FIG.10.

While we have described the principles of our invention in connection with specific apparatus, it is to be clearly understood that this description is made only by way of example and not as a limination to the scope of our invention as set forth in the objects thereof and in the accompanying claims.

We claim:

1. A transmission system for imprinted intelligence comprising a first enclosure opaque to first energy and transparent to second energy distinct from said first energy; a first medium imparting a first intensity to said second energy contained in said first enclosure; said first medium having impressed on a surface thereof said imprinted intelligence in the form of a first visible trace imparting a second intensity distinct from said first intensity to said second energy; a first means disposed with respect to said first enclosure to sense through said first enclosure said imprinted intelligence by means of said second energy, said medium and said first trace cooperating to intensity modulate said second energy in accordance with said imprinted intelligence; second means coupled to said first means to convert said intensity modulated second energy into electrical signals representative of said imprinted intelligence; a second enclosure opaque to said first energy and transparent to a third energy distinct from said first energy disposed at a point remote from said second means; a second medium contained within said second enclosure responsive to said third energy to reproduce said imprinted intelligence in the form of a second visible trace on a surface thereof; third means disposed at said remote point to convert said electrical signal into said third energy representative of said imprinted intelligence; and fourth means to couple said electrical signal from said second means to said third means.

2. A transmission system according to claim 1, wherein said first energy is visible light.

3. A transmission system according to claim 1, wherein said fourth means includes a coding means coupled to said second means to encode said electrical signal, and a decoding means disposed at said remote point coupled to said coding means to decode said encoded electrical signal to recover said electrical signal.

4. A transmission system according to claim 1, wherein said second energy includes electromagnetic radiation, said first medium includes a first material having a first radiation characteristic with respect to said radiation to impart said first intensity thereto, and said first trace includes a second material having a second radiation characteristic with respect to said radiation different than said first characteristic to impart said second intensity thereto.

5. A transmission system according to claim 4, wherein said electromagnetic radiation is X-rays, said first material is transparent to X-rays, and said second material is opaque to X-rays.

6. A transmission system according to claim 1, wherein said second energy is X-ray energy, said first medium includes a material transparent to said X-ray energy, and said first trace includes a material opaque to said X-ray energy.

7. A transmission system according to claim 1, wherein said second energy includes a first electromagnetic radiation, said first medium includes a first material having a first radiation characteristic with respect to said first radiation to impart said first intensity thereto, said first trace includes a second material having a second radiation characteristic with respect to said first radiation different than said first characteristic to impart said second intensity thereto, said third energy includes second electromagnetic radiation, and at least said surface of said second medium is coated with a third material sensitive to said second electromagnetic radiation.

8. A transmission system according to claim 1, wherein said first electromagnetic radiation is X-rays, said first material is transparent to X-rays, said second material is opaque to X-rays, said second electromagnetic radiation is X-rays, and said third material changes its color when exposed to said X-rays.

9. A transmission system according to claim 1, wherein said second energy is electrical energy, and said first trace includes a metallic material.

10. A transmission system according to claim 1, wherein said second energy is magnetic energy, and said first trace includes a magnetic material.

11. A transmission system for a plurality of items of imprinted intelligence comprising a plurality of first enclosures opaque to visible light and transparent to first energy distinct from visible light; a first medium contained in each of said first enclosures imparting a first intensity to said first energy; each of said first mediums having impressed on a surface thereof one of said plurality of items of said imprinted intelligence in the form of a first visible trace imparting a second intensity distinct from said first intensity to said first energy; a plurality of first means each disposed with respect to an associated one of said first enclosures to sense through said first enclosures said one of said items of said imprinted intelligence by means of said first energy, each of said mediums and each of said first traces cooperating to intensity modulate said first energy in accordance with said one of said items of said imprinted intelligence; a plurality of second means each coupled to an associated one of said first means to convert said modulated first energy into a plurality of time separated electrical signals each representative of one of said items of said imprinted intelligence; a plurality of second enclosures opaque to visible light and transparent to second energy distinct from visible light disposed at a point remote from said second means; a second medium contained within each of said second enclosures responsive to said second energy to reproduce the associated one of said items of said imprinted intelligence in the form of a visible trace on a surface thereof; a plurality of third means disposed at said remote point in registry with an associated one of said second enclosures to convert the associated one of said electrical signals to said second energy; and fourth means to couple said electrical signals from said second means to said third means.

12. A method of transmitting imprinted intelligence comprising the steps of impressing said imprinted intelligence in the form of a visible trace imparting a first intensity to a first energy distinct from visible light upon the surface of a medium imparting a second intensity to said first energy; sealing said medium in a first enclosure opaque to visible light and transparent to said first energy; feeding said first enclosure into a device to sense said imprinted intelligence impressed on said medium through said first enclosure by means of said first energy and convert said sensed imprinted intelligence into electrical signals; transmitting said electrical signals to a remote location; receiving said electrical signals at said remote location; preparing a second enclosure opaque to visible light and transparent to a second energy distinct from visible light containing a blank medium having at least a surface thereof sensitive to said second energy sealed therein; and feeding said second enclosure into a device to convert said electrical signals to said second energy and reproduce said imprinted intelligence on said surface of said blank medium.

13. A component of a transmission system for imprinted intelligence comprising an enclosure opaque to visible light and transparent to energy distinct from visible light; and a medium imparting a first intensity to said energy contained in said enclosure; said medium having impressed on a surface thereof said imprinted intelligence in the form of a visible trace imparting a second intensity distinct from said first intensity to said energy.

14. A component according to claim 13, wherein said energy includes electromagnetic radiation, said medium includes a first material having a first radiation characteristic with respect to said radiation to impart said first intensity thereto, and said first trace includes a second material having a second radiation characteristic with respect to said radiation different than said first characteristic to impart said second intensity thereto.

15. A component according to claim 14, wherein said electromagnetic radiation is X-rays, said first material is transparent to X-rays, and said second material is opaque to X-rays.

16. A component according to claim 13, wherein said energy is electrical energy, and said trace includes a metallic material.

17. A component according to claim 13 wherein said energy is magnetic energy, and said trace includes a magnetic material.

18. In a transmission system for imprinted intelligence, a transmitter comprising an enclosure opaque to visible light and transparent to energy distinct from visible light; a medium imparting a first intensity to said energy contained in said enclosure; said medium having impressed on a surface thereof said imprinted intelligence in the form of a visible trace imparting a second intensity distinct from said first intensity to said energy; first means disposed with respect to said enclosure to sense through said enclosure said imprinted intelligence by means of said energy, said medium and said trace cooperating to intensity modulate said energy in accordance with said imprinted intelligence; second means coupled to said first means to convert said intensity modulated energy into electrical signals representative of said imprinted intelligence; and third means coupled to said second means to couple said electrical signals to a point remote from said first means.

19. A transmitter according to claim 18, wherein said energy includes electromagnetic radiation, said medium includes a first material having a first radiation characteristic with respect to said radiation to impart said first intensity thereto, and said first trace includes a second material having a second radiation characteristic with respect to said radiation different than said first characteristic to impart said second intensity thereto.

20. A transmitter according to claim 19, wherein said electromagnetic radiation is X-rays, said first material is transparent to X-rays, and said second material is opaque to X-rays.

21. A transmitter according to claim 18, wherein said energy is electrical energy, and said trace includes a metallic material.

22. A transmitter according to claim 18, wherein said energy is magnetic energy, and said trace includes a magnetic material.

23. In a transmission system for imprinted intelligence, a receiver comprising first means to receive electrical signals representative of said imprinted intelligence; an enclosure opaque to visible light and transparent to energy distinct from visible digit; a medium contained within said enclosure having at least a surface thereof sensitive to said energy; and second means coupled to said first means and disposed relative to said enclosure to convert said electrical signals to said energy and reproduce said imprinted intelligence in the form of a visible trace on said surface of said medium.

24. A receiver according to claim 23, wherein said energy includes electromagnetic radiation, and said surface of said medium is coated with a material sensitive to said radiation.

25. A receiver according to claim 24, wherein said radiation is X-rays, and said material changes its color when exposed to said X-rays.

26. A system for transmitting intelligence contained in a light opaque enclosure comprising a light opaque enclosure containing a medium transparent to X-rays having said intelligence printed thereon by barium, means disposed on one side of said enclosure to produce and direct an X-ray beam through said enclosure and said medium, said X-ray beam being varied in intensity by said barium, means disposed on the other side of said enclosure responsive to said X-ray beam to convert said intensity varying X-ray beam into electrical signals representative of said intelligence, means disposed at a point remote from said means responsive to convert said electrical signals into said intelligence on a second medium, and means to couple said electrical signals from said means responsive to said means to convert.

27. A system for transmitting intelligence contained in a light opaque enclosure comprising a light opaque enclosure containing a first medium transparent to X-rays having said intelligence printed thereon by a printing material opaque to X-rays, means disposed on one side of said enclosure to produce and direct an X-ray beam through said enclosure and said medium, said X-ray beam being varied in intensity by said printing material, means disposed on the other side of said enclosure responsive to said X-ray beam to convert said intensity varying X-ray beam into electrical signals representative of said intelligence, means disposed at a point remote from said means responsive to convert said electrical signals into said intelligence on a second medium, and means to couple said electrical signals from said means responsive to said means to convert.

28. A system for transmitting intelligence contained in a light opaque enclosure comprising a light opaque enclosure containing a first medium transparent to X-rays having intelligence printed thereon by a printing material opaque to X-rays, means disposed on one side of said enclosure to product and direct a first X-ray beam through said enclosure and said medium, said first X-ray beam being varied in intensity by said printing material, means disposed on the other side of said enclosure responsive to said X-ray beam to convert said intensity varying X-ray beam into electrical signals representative of said intelligence, means located at a point remote from said means responsive to convert said electrical signals into a second X-ray beam varying in intensity in accordance with said intelligence, a second light opaque enclosure containing a second medium, said second medium being responsive to said second X-ray beam to translate said second X-ray beam to said intelligence, and means to couple said electrical signals from said means responsive to said means to convert.

29. A system for transmitting intelligence contained in a light opaque enclosure comprising a light opaque enclosure containing a first medium transparent to X-rays having said intelligence printed thereon by a printing material opaque to X-rays, means disposed on one side of said enclosure to produce and direct a first X-ray beam through said enclosure and said first medium, said first X-ray beam being varied in intensity by said printing material, means disposed on the other side of said enclosure responsive to said first X-ray beam to convert said intensity varying X-ray beam into electrical signals representative of said intelligence, means located at a point remote from said means responsive to convert said electrical signals into a second X-ray beam varying in intensity in accordance with said intelligence, a second light opaque enclosure containing a second medium including a coating of potassium hydride activate of potassium bromide crystals thereon, said crystals being responsive to said second X-ray beam to reproduce said intelligence, and means to couple said electrical signals from said means responsive to said means to convert.

30. A system for transmitting intelligence contained in a light opaque enclosure comprising a light opaque enclosure containing a first medium transparent to X-rays having said intelligence printed thereon by barium, means disposed on one side of said enclosure to produce and direct a first X-ray beam through said enclosure and said first medium, said first X-ray beam being varied in intensity by said barium, means disposed on the other side of said enclosure responsive to said first X-ray beam to convert said intensely varying X-ray beam into electrical signals representative of said intelligence, means located at a point remote from said means responsive to convert said electrical signals into a second X-ray beam varying in intensity in accordance with said intelligence, a second light opaque enclosure containing a second medium including a coating of potassium hydride activate of potassium bromide crystals thereon, said crystals being responsive to said second X-ray beam to translate said second X-ray beam to said intelligence, and means to couple said electrical signals from said means responsive to said means to convert.

31. A system for transmitting intelligence printed on a medium contained in a light opaque enclosure comprising an X-ray scanner to produce an X-ray beam of constant intensity deflected in a predetermined manner, a scintillation counter responsive to said X-ray beam to produce electrical signals when said X-ray beam impinges thereon, a synchronizing signal generator coupled to said X-ray scanner to control the operation thereof, a light opaque enclosure containing a printing medium with intelligence printed thereon in the form of barium tracings, said enclosure being disposed between said X-ray scanner and said scintillation counter to vary said electrical signals in accordance with the interruption of said X-ray beam by said barium tracings, a transmitter means coupled to said scintillation counter and said synchronizing signal generator to transmit said varying electrical signals and the synchronizing signals from said synchronizing signal generator through a propagation medium, a receiver means at a point remote from said transmitter means to receive said varying electrical signals and said synchronizing signals, a synchronizing signal separator coupled to said receiver means to separate said synchronizing signals from said varying electrical signals, a second X-ray scanner coupled to said receiver means and said synchronizing signal separator to operate in synchronism with said first X-ray scanner and to produce a second X-ray beam varying in intensity in accordance with said varying electrical signals, and a second printing medium contained in a light opaque eclosure including a coating of potassium hydride activate of potassium bromide crystals thereon responsive to said second X-ray beam to translate said second X-ray beam to said intelligence.

32. A system for transmitting intelligence printed on a medium contained in a light opaque enclosure comprising an X-ray scanner to produce an X-ray beam of constant intensity deflected in a predetermined manner, a scintillation counter responsive to said X-ray beam to produce electrical signals when said X-ray beam impinges thereon, a synchronizing signal generator coupled to said X-ray scanner to control the operation thereof, a light opaque enclosure containing a printing medium with intelligence printed thereon in the form of barium tracings, said enclosure being disposed between said X-ray scanner and said scintillation counter to vary said electrical signals in accordance with the interruption of said X-ray beam by said barium tracings, a coding device coupled to said scintillation counter to encode said varying electrical signals according to a predetermined code, a transmitter means coupled to said coding device and said synchronizing signal generator to transmit said coded varying electrical signals and the synchronizing signals from said synchronizing signal generator through a propagation medium, a receiver means at a point remote from said transmitter means to receive said coded varying electrical signals and said synchronizing signals, a decoding device coupled to said receiver means to decode said coded varying electrical signals, a synchronizing signal separator coupled to said receiver means to separate said synchronizing signals from said coded varying electrical signals, a second X-ray scanner coupled to said decoder device and said synchronizing signal separator to operate in synchronism with said first X-ray scanner and to produce a second X-ray beam varying in intensity in accordance with said varying electrical signals, and a second printing medium contained in a light opaque enclosure including a coating of potassium hydride activate of potassium bromide crystals thereon responsive to said second X-ray beam to translate said second X-ray beam to said intelligence.

References Cited by the Examiner

UNITED STATES PATENTS

| | | | |
|---|---|---|---|
| 2,234,328 | 3/1941 | Wolff | 178—6 |
| 2,354,199 | 7/1944 | Collins | 178—6 X |
| 2,407,381 | 9/1946 | Pecher | 250—65 |
| 2,689,279 | 9/1954 | Noregaard | 200—87 |
| 2,914,746 | 11/1959 | James | 178—6 |
| 2,975,282 | 3/1961 | Schaffer | 250—65 |

OTHER REFERENCES

Electronic Engineering, "A Large Screen X-Ray Image Amplifier," June 1959.

DAVID G. REDINBAUGH, *Primary Examiner.*

ROY LAKE, *Examiner.*

R. M. HESSIN, T. G. KEOUGH, R. L. RICHARDSON, *Assistant Examiners.*